United States Patent
Hood et al.

(10) Patent No.: US 9,821,589 B2
(45) Date of Patent: Nov. 21, 2017

(54) COATING COMPOSITIONS FOR FORMING TONER RECEPTIVE COATINGS

(71) Applicant: ISP INVESTMENTS INC., Wilmington, DE (US)

(72) Inventors: David K. Hood, Basking Ridge, NJ (US); Charles J. Wasserman, Waukesha, WI (US); Karyn B. Visscher, Morris Plains, NJ (US); Sounak Sarkar, Lodi, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 0 days.

(21) Appl. No.: 14/779,419

(22) PCT Filed: Mar. 25, 2014

(86) PCT No.: PCT/US2014/031662
§ 371 (c)(1),
(2) Date: Sep. 23, 2015

(87) PCT Pub. No.: WO2014/160672
PCT Pub. Date: Oct. 2, 2014

(65) Prior Publication Data
US 2016/0059607 A1    Mar. 3, 2016

Related U.S. Application Data

(60) Provisional application No. 61/805,307, filed on Mar. 26, 2013, provisional application No. 61/827,195, filed on May 24, 2013.

(51) Int. Cl.
| | | |
|---|---|---|
| C09D 139/04 | (2006.01) | |
| B41M 5/52 | (2006.01) | |
| C08F 226/08 | (2006.01) | |
| C08F 218/08 | (2006.01) | |
| C08F 226/06 | (2006.01) | |
| C08F 226/10 | (2006.01) | |
| C09D 139/06 | (2006.01) | |
| C08F 220/28 | (2006.01) | |

(52) U.S. Cl.
CPC ......... B41M 5/5254 (2013.01); C08F 218/08 (2013.01); C08F 226/06 (2013.01); C08F 226/08 (2013.01); C08F 226/10 (2013.01); C09D 139/04 (2013.01); C09D 139/06 (2013.01); *C08F 2220/283* (2013.01)

(58) Field of Classification Search
CPC .... C08F 226/06; C08F 226/08; C08F 226/10; C08F 218/08; C08F 2220/283; C09D 139/04; C09D 139/06
See application file for complete search history.

(56) References Cited

U.S. PATENT DOCUMENTS

| | | | |
|---|---|---|---|
| 5,037,700 A | 8/1991 | Davis | |
| 2004/0121093 A1* | 6/2004 | Ogino | B41M 5/0035 |
| | | | 428/32.1 |
| 2009/0297738 A1* | 12/2009 | Song | B41M 5/52 |
| | | | 428/32.3 |
| 2010/0041846 A1 | 2/2010 | Hood et al. | |
| 2011/0036257 A1 | 2/2011 | Lawrence | |
| 2012/0027964 A1* | 2/2012 | Hood | B41M 5/508 |
| | | | 428/32.16 |
| 2013/0261268 A1* | 10/2013 | Hood | C09D 139/04 |
| | | | 525/326.9 |

FOREIGN PATENT DOCUMENTS

| | | |
|---|---|---|
| WO | WO2012051153 A2 | 4/2012 |
| WO | WO2012148533 A1 | 11/2012 |

OTHER PUBLICATIONS

International Search Report, PCT/US2014/031662 dated Oct. 2, 2014.

* cited by examiner

*Primary Examiner* — Betelhem Shewareged
(74) *Attorney, Agent, or Firm* — William J. Davis

(57) ABSTRACT

The present invention provides coating composition for forming a toner receptive coating on a substrate containing a polymer comprising: (a) a N-vinyl amide monomer, (b) a vinyl acetate monomer, (c) a substituted or unsubstituted monomer comprising a cyclic ether, and (d) a solvent. The coating compositions may further comprise a (e) non-reactive hydrophobic monomer. The invention also provides substrates coated with the toner receptive coatings.

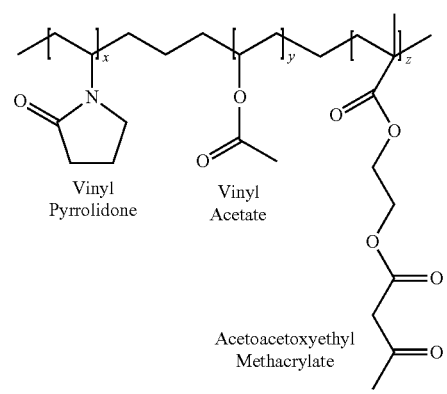

29 Claims, No Drawings

COATING COMPOSITIONS FOR FORMING TONER RECEPTIVE COATINGS

FIELD OF THE INVENTION

This invention provides coating compositions for forming toner receptive coatings on a substrate. This invention also provides substrates coated with the toner receptive coatings. The coating compositions include a reactive monomer comprising an acetoacetate moiety, and may further comprise a non-reactive hydrophobic monomer.

BACKGROUND OF THE INVENTION

Coating compositions for forming toner receptive coatings are successful method for forming images on different substrates such as paper, polyester, vinyl, and canvas. However, printing onto substrates such as plastics, such as vinyl, polyester, and polyolefin has not attained the print quality, integrity, and adhesion commonly observed for paper substrates.

United States Patent Application Publications US 2007/0092666 and US 2007/0092668 disclose coating compositions for forming ink jet-receptive coatings on a substrate. United States Patent Application Publication U.S. Pat. No. 8,198,353 B2 and U.S. Pat. No. 5,789,123 disclose coating compositions for forming liquid toner receptive coatings on a substrate. International Publication Number WO 2005/115763 A1 discloses coating compositions for forming liquid toner receptive coatings on a substrate.

WO 2012/051153 and WO 2012/148533 disclose lactamic polymers containing an acetoacetate moiety.

U.S. Pat. Nos. 5,798,426, 5,852,094, and 6,969,734 B1 disclose acetoacetate containing materials. International Publication Number WO 2010/120278 A1 discloses latex polymer particles comprising the acetoacetate moiety. International Publication Number WO 2004/029118 A2 discloses materials comprising the acetoacetate-functional donor compounds. The reactive functionality of a polyvinyl amide polymerizable polymer comprising an acetoacetate moiety is disclosed in "UV-coating formulation in a new light: A new lactamic oligomer formulating tool to overcome current challenges" by D. K. Hood et. al. (*European Coatings Journal* 1: p36-38, 2013).

The functional attributes of acetoacetoxyethyl methacrylate are disclosed in Eastman Chemical's "Acetoacetoxyethyl methacrylate (AAEM) Acetoacetyl Chemistry" Brochure (Publication Number N-319C, December 1999), which disclosure is incorporated by reference herein. The functional and chemical attributes of diketene chemistry are disclosed in "*Diketene*" by R. Clemens (Chemical Reviews, Volume 86, Number 2, April 1986), which disclosure is incorporated by reference herein. The functional and chemical attributes of ketene chemistry are disclosed in "*Ketenes II*" by T Tidwell (J. Wiley and Sons, New Jersey, USA, 2006), which disclosure is incorporated by reference herein.

EP 1578824B1 describes a curable liquid composition containing an acryloyl group containing resin produced by reacting monofunctional vinyl compounds and multifunctional acrylic esters with β-dicarbonyl group. Self-initiating photocurable resins that UV-cure with little or no photoinitiator are described in Michael L. Gould et al., *Novel Self-Initiating UV-Curable Resins: Generation Three*, 1 PROCEEDINGS FROM RAD TECH EUROPE 05, 245-51 (2005). These disclosures are incorporated by reference herein.

Accordingly, there is a need for improved toner receptive coatings, which exhibit improved properties including the ability to absorb and retain the ink effectively in both solvent-based and water-based ink printable forms. There is also a need to provide substrates which are coated with coating compositions that are both solvent-based and water-based ink printable.

SUMMARY OF THE INVENTION

The present invention provides coating compositions for forming a toner receptive coating on a substrate containing a polymer comprising: (a) a N-vinyl amide monomer, (b) a vinyl acetate monomer, (c) a reactive monomer comprising an acetoacetate moiety, and (d) a solvent. The coating compositions may further comprise (e) a non-reactive hydrophobic monomer.

The present invention further provides toner substrates coated with the coating compositions.

DETAILED DESCRIPTION OF THE INVENTION

This invention provides coating compositions for forming toner receptive coatings on a substrate. This invention also provides substrates coated with the toner receptive coatings. The coating compositions include a reactive monomer comprising an acetoacetate moiety, and may further comprise a non-reactive hydrophobic monomer.

As used herein, the following terms have the meanings set out below.

The term "acidic conditions" refers to conditions relating to the pH value of an aqueous solution. Pure water is considered to be neutral, with a pH close to 7.0 at 25° C. Solutions with a pH value less than 7 are considered to be acidic solutions.

The term "anion" refers to an "anionic" (adjective) ion, which has more electrons than protons, providing it with a net negative charge.

The term "anionic addition polymerization" refers to a form of chain-growth polymerization or addition polymerization that involves the polymerization of vinyl monomers with strong electronegative groups. The polymerization is carried out through a carbanion active species. Addition polymerizations take place in three steps: chain initiation, chain propagation, and chain termination.

The term "basic conditions" refers to conditions relating to the pH value. Pure water is considered to be neutral, with a pH close to 7.0 at 25° C. Solutions with a pH value greater than 7 are considered to be basic or alkaline.

The term "branched and unbranched alkyl groups" refers to alkyl groups, which may be straight chained or branched. For example, the alkyl groups have from 1 to about 30 carbon atoms, more particularly, from 1 to about 25 carbon atoms, and yet more particularly from 1 to about 20 carbon atoms. Branched groups include isopropyl, sec-butyl, tert-butyl, and the like.

The term "cation" refers to an "cationic" (adjective) ion, which has fewer electrons than protons, providing it with a net positive charge.

The term "copolymer" refers to chains comprising more than one type of monomer unit.

The term "cyclic" in chemistry refers to a compound in which a series of atoms is connected to form a loop or ring. The vast majority of cyclic compounds are organic. Cyclic compounds may or may not be aromatic. The term "polycyclic" is used when more than one ring is formed in a single molecule.

The term "ether" refers to a class of organic compounds that contain an ether group, an oxygen atom connected to two alkyl or aryl groups. An example is the solvent diethyl ether ($CH_3CH_2OCH_2CH_3$). Ethers are common in organic chemistry and pervasive in biochemistry, as they are common linkages in carbohydrates and lignin.

The term "halogen" refers to chloro, bromo, iodo and fluoro, and in one embodiment is bromo and/or chloro.

The term "heteroatom" refers to atoms such as oxygen, nitrogen, sulfur, and phosphorous. When the heteroatom is a nitrogen atom, the nitrogen atom may be present in the form of a quaternary amine.

The term "hydrophilic" refers to a molecular entity that tends to be polarized and is attracted to, and tends to be dissolved by, water. A hydrophilic molecule or portion of a molecule is one that has a tendency to interact with or be dissolved by water and other polar substances. A hydrophilic molecule or portion of a molecule is one that is typically charge-polarized and capable of hydrogen bonding, enabling it to dissolve more readily in water than in oil or other hydrophobic solvents.

The term "hydrophobic" refers to a molecular entity that tends to be non-polar and, thus, prefers other neutral molecules and non-polar solvents. Examples of hydrophobic molecules include the alkanes, oils, fats, and greasy substances in general. Hydrophobic is often used interchangeably with lipophilic, "fat-loving"; however, the two terms are not synonymous.

The term "inert solvent" refers to a solvent that does not interfere chemically with the reaction.

The term "mineral acid" refers to an acid derived from one or more inorganic compounds. Mineral acids release hydrogen ions when dissolved in water. Commonly used mineral acids are sulfuric acid, hydrochloric acid, and nitric acid.

The term "monomer" refers to the repeat units comprising a polymer. A monomer is a small molecule that chemically bonds to other monomers to form a polymer.

The term "non-homopolymer" refers to a polymer formed from two or more monomers and includes essentially all polymers that are not homopolymers. Nonlimiting examples of non-homopolymers include copolymers, terpolymers, tetramers, and the like, wherein the non-homopolymer is a random, blocked, or alternating polymer.

The term "nonion" refers to an "nonionic" (adjective) ion, an ion that has no charge.

The term "pH" refers to a measure of the acidity or basicity of an aqueous solution. Pure water is considered to be neutral, with a pH close to 7.0 at 25° C. Solutions with a pH less than 7 are considered to be acidic and solutions with a pH greater than 7 are considered to be basic or alkaline.

The term "polymer" refers to a large molecule (macromolecule) composed of repeating structural units (monomers) connected by covalent chemical bonds.

The term "polymerization" refers to methods for chemically reacting monomer compounds to form polymer chains. The polymer chain may be alternating, branched, blocked, or random. The type of polymerization method may be selected from a wide variety of methods. Such methods include, but are not limited to, free radical polymerization methods, such as classical radical polymerization and controlled radical polymerization, Nitroxide Mediation Polymerization (NMP), Atom Transfer Radical Polymerization (ATRP), and Reversible Addition Fragmentation Chain-Transfer (RAFT).

The term "reactive solvent" refers to a solvent capable of transforming, particularly polymerizing or curing, upon suitable activation or initiation. Examples include monomers comprising at least one cyclic ether or vinyl ether functional groups capable of solvating an inventive polymer. Background on epoxy chemistry and technology can be found in the "Handbook of Epoxy Resins" by Lee and Neville (McGraw-Hill, New York, 1967). Blends of reactive solvents and polymerizable polymers may also be employed.

The present invention provides coating compositions for forming a toner receptive coating on a substrate containing a polymer comprising: (a) a N-vinyl amide monomer, (b) a vinyl acetate monomer, (c) a reactive monomer comprising an acetoacetate moiety, and (d) a solvent.

Preferably, the (a) N-vinyl amide monomer is selected from the group consisting of N-vinyl pyrrolidone, N-vinyl valerolactam, N-vinyl caprolactam, hydroxyethylpyrrolidone methacrylate, and N-vinyl formamide. More preferably, the (a) N-vinyl amide monomer is selected from the group consisting of N-vinyl pyrrolidone, N-vinyl valerolactam, and N-vinyl caprolactam.

Additional examples of suitable lactamic monomers (N-vinyl amide monomers) are disclosed in "A novel route to substituted poly(vinyl pyrrolidone)s via simple functionalization of 1-vinyl-2-pyrrolidone in the 3-position by ring-opening reactions" by H. Reinecke et. al. (*Eur. Poly. J.*, 46 (2010) p1557-1562) and "Synthesis and polymerization of new pyrrolidone-containing methacrylate monomers" by T. P. Davis et. al. (*Polymer*, 39, 17, p4165-4169, 1998). Background on the chemistry, structure, and properties of lactamic polymers can be found in "N-Vinyl Amide Polymers" by E. S. Barabas (*Encyclopedia of Polymer Science and Engineering*, 17, $2^{nd}$ ed., p 198-257, (1989)) and in "Polymers of N-Vinylpyrrolidone: Synthesis, Characterization and Uses" by F. Haaf, A. Sanner, and F. Straub (*Polymer Journal*, 17, 1, p143-152 (1985)).

The (b) vinyl acetate (ethenyl acetate, ethenyl ethanoate) monomer is an organic compound derived from the formula $CH_3COOCH=CH_2$.

Preferably, the combination of the (a) N-vinyl amide monomer, the (b) vinyl acetate monomer is selected from the group consisting of poly(N-vinyl pyrrolidone-co-vinyl acetate) materials including PVP/VA E-335, 1-335, E-535, 1-535, E-735, and 1-735, available from Ashland Specialties Ingredients. Examples of poly(N-vinyl pyrrolidone-co-vinyl acetate) also include Luvitec VA 64, VA 64W and the hydrophobically modified Collacral® VAL, available from BASF. Collacral® VAL is an aqueous solution of a vinylpyrrolidone copolymer used to thicken and stabilize polymer dispersions and other aqueous systems. Collacral® VAL is employed as a thickener for polymer dispersions and other aqueous systems and can be used as a protective colloid when resin solutions are mixed with polymer dispersions. Collacral® VAL has a maximum thickening effect in polymer dispersions at a pH of approximately 5. Collacral® VAL can also be employed as a protective colloid in the production of resin dispersions and when resin solutions are mixed with polymer dispersions. More preferably the combination polymer is N-vinyl pyrrolidone-co-vinyl acetate include PVP/VA E-535, 1-535, W-635, S-630, and E-635, available from Ashland Specialties Ingredients.

The monomer in the (c) reactive monomer comprising an acetoacetate moiety may be selected from the group consisting of amide, alkyl, carboxyl, carbonyl, and ether groups. The (c) reactive monomer comprising an acetoacetate moiety may be selected from the group consisting of acetoacetoxyethyl methacrylate, acetoacetoxyethyl acrylate, and allyl acetoacetate.

Suitable (d) solvents in the coating compositions comprise aqueous and non-aqueous solvents. Illustrative non-limiting examples of solvents include water, ethanol, isopropanol, butanol, acetone, methyl ethyl ketone, ethyl acetate, reactive solvents and mixtures thereof. Other suitable solvents are described in the "Industrial Solvents Handbook, 4$^{th}$ Edition" edited by E. W. Flick (Noyes Data Corporation, Park Ridge, N.J., 1991) and in the "Polymer Handbook, 4$^{th}$ Edition," edited by J. Brandrup et. al. (J. Wiley and Sons, New York, 1999), which disclosures are incorporated by reference herein. A solvent is a substance that dissolves a solute resulting in a solution. In solution, all of the ingredients are uniformly distributed at a molecular level and no residue remains. The mixing is referred to as miscibility, whereas the ability to dissolve one compound into another is known as solubility. However, in addition to mixing, both substances in the solution interact with each other. Solvents can be broadly classified into two categories: polar and non-polar. The polarity, dipole moment, polarizability and hydrogen bonding of a solvent determines what type of compounds it is able to dissolve and with what other solvents or liquid compounds it is miscible. Polar solvents dissolve polar compounds best and non-polar solvents dissolve non-polar compounds best. Strongly polar compounds like sugars (e.g., sucrose) or ionic compounds, like inorganic salts (e.g., table salt) dissolve only in very polar solvents like water, while strongly non-polar compounds like oils or waxes dissolve only in very non-polar organic solvents like hexane. Similarly, water and hexane (or vinegar and vegetable oil) are not miscible with each other.

Examples of reactive solvents and co-solvents include, but are not limited to, 2-hydroxy methyl methacrylate (HEMA), 2-hydroxy ethyl acrylate (HEA), 2-phenoxy ethyl acrylate (PEA), 2-ethylhexyl-diglycol acrylate, 2-(2-ethoxyethoxy)ethyl acrylate (EOEOEA), lauryl acrylate (LA), stearyl acrylate (SA), isobornyl acrylate (IBOA), acrylic acid-2-ethylhexyl ester, isodecyl acrylate, diacetone acrylamide, acryloyl morpholine (ACMO), cyclic trimethylolpropane formal acrylate (CTFA), 3-(methacryloylamino)propyl]trimethylammonium chloride (MAPTAC), 4-hydroxybutyl acrylate, (3-Acrylamidopropyl)trimethylammonium chloride (APTAC), C8-C 10 acrylate (ODA), isodecyl acrylate (ISODA), lauryl methacrylate (LM), stearyl methacrylate (SM), 2,2,2-trifluoroethyl methacrylate, 2-acrylamido-2-methyl-1-propanesulfonic acid, 2-acrylamido-2-methyl-1-propanesulfonic acid sodium salt, [2-(methacryloyloxy)ethyl]dimethyl-(3-sulfopropyl) ammonium hydroxide, [3-(methacryloylamino)propyl] dimethyl(3-sulfopropyl)ammonium hydroxide inner salt, 1,6-hexanediol diacrylate (HDDA), dipropylene glycol diacrylate (DPGDA), tripropylene glycol diacrylate (TPGDA), water, alcohol, hydro-alcohol mixtures, 1,4-butanediol diacrylate (BDDA), tripropylene glycol diacrylate (TPGDA), dipropyleneglycol diacrylate (DPGDA), tripropylene glycol diacrylate (TRPGDA), 1,9-nonanediol diacrylate (NNDA), neopentyl glycol diacrylate (NPGDA), propoxylated neopentyl glycol diacrylate (NPG2PODA), polyethylene glycol (200) diacrylate (PEG(200)DA), polyethylene glycol (400) diacrylate (PEG(400)DA), polyethylene glycol (600) diacrylate (PEG(600)DA), ethoxylated bisphenol-A diacrylate (BPA2EODA), triethylene glycol diacrylate (TEGDA), triethylene glycol dimethacrylate (TEGDMA), glycerol propoxylated triacrylate (GPTA), diethylene glycol dimethacrylate (DEGDMA), ethoxylated bisphenol-A dimethacrylate (BPA10EODMA), trimethylolpropane triacrylate (TMPTA), pentaerythritol triacrylate (PET3A), ethoxylated tri-methylolpropane triacrylate (TMP3EOTA), propxylated tri-methylolpropane triacrylate (TMP3POTA), propoxylated glyceryl triacrylate (GPTA), trimethylolpropane trimethylacrylate (TMPTMA), ethoxylated trimethylolpropane trimethacrylate (TMP3EOTMA), 2,2-dionol diacrylate, pentaerythritol tetraacrylate (PETA), neopentylglycol diacrylate hydroxypivalate, 2-acryloyloxyethylphthalic acid, 2-acryloyloxyethyl-2-hydroxyethylphthalic acid, dimethyloltricyclodecane diacrylate, 2-acryloyloxyethylsuccinic acid, nonylphenol ethylene oxide adduct acrylate, phenol acrylates, methoxy-polyethylene glycol acrylate, tetramethylolmethane triacrylate, dipentaerythritol hexaacrylate (DPHA), isocyanate-functional unsaturated acrylic ester resin, urethane diacrylates oligomers, urethane acrylates, modified urethane acrylates, polyester acrylates, modified bisphenol A diacrylate, phenoxy-polyethylene glycol acrylate, bisphenol A propylene oxide modified diacrylate, bisphenol A ethylene oxide adduct diacrylate, pentaerythritol triacrylate hexamethylenediisocyanate, urethane prepolymer, isoamyl acrylate, isomyristyl acrylate, isostearyl acrylate, carbitol acrylate, cyclohexyl acrylate, tetrahydrofurfuryl acrylate, glycidyl acrylates, acrylamides, polyfunctional acrylamides, polyfunctional (polyethylene glycol) acrylates, polyfunctional vinyl amides, 1,4-butane-diol-monoacrylate and/or diglycidyl ether of 1,4-butanediol, and the like, and mixtures thereof.

Additional examples of reactive solvents and co-solvents include, but are not limited to, methyl vinylether, ethyl vinylether, propyl vinylether, n-butyl vinylether, t-butyl vinylether, 2-ethylhexyl vinylether, n-nonyl vinylether, lauryl vinylether, cyclohexyl vinylether, cyclohexylmethyl vinylether, 4-methylcyclohexylmethyl vinylether, benzyl vinylether, dicyclopentenyl vinylether, 2-dicyclopentenoxyethyl vinyl ether, methoxyethyl vinylether, ethoxyethyl vinylether, butoxyethyl vinyl ether, methoxyethoxy vinylether, ethoxyethoxyethyl vinylether, methoxypolyethylene glycol vinylether, tetrahydrofurfuryl vinylether, dodecyl vinylether, diethylene glycol monovinylether, 2-hydroxyethyl vinylether, 2-hydroxypropyl vinylether, 4-hydroxybutyl vinylether, 4-hydroxymethylcyclohexylmethyl vinylether, polyethylene glycol vinylether, chloroethyl vinylether, chlorobutyl vinylether, phenylethyl vinylether, phenoxypolyethylene glycol vinylether, ethylene glycol divinylether, butylenes glycol divinylether, hexandiol divinylether, bisphenol A alkyleneoxide divinylethers, bisphenol F alkyleneoxide divinylethers, propyleneoxide adducts of trimethylolpropane trivinylether, triethylene glycol divinylether, cyclohexane dimethanol divinylether, N-vinyl-2-pyrrolidone (VP), N-vinyl caprolactam (VCap), N-vinyl imidazole (VI), n-vinyl amides, 4-vinyl pyridine, 2-vinyl pyridine, styrene, 5-vinyl-2-norbornene and the like, and mixtures thereof.

Preferably, (a) is 0.1-80%, (b) is 1-80%, (c) is 0.1-80%, and (d) is to 100%, by weight. More preferably, (a) is 1-70%, (b) is 1-60%, (c) is 0.5-20%, and (d) is to 100%, by weight. Most preferably, (a) is 1-60%, (b) is 1-50%, (c) is 0.1-10%, and (d) is to 100%, by weight.

Preferably, the polymer comprising: (a) a N-vinyl amide monomer, (b) a vinyl acetate monomer, (c) a reactive monomer comprising an acetoacetate moiety, and (d) a solvent is selected from the group consisting of vinyl pyrrolidone/vinyl acetate/acetoacetoxyethyl methacrylate, vinyl caprolactam/vinyl acetate/acetoacetoxyethyl methacrylate, vinyl pyrrolidone/vinyl acetate/allyl acetoacetate, and vinyl caprolactam/vinyl acetate/allyl acetoacetate.

In another aspect, the polymer further comprises (e) a non-reactive hydrophobic monomer. The (e) non-reactive hydrophobic monomer may comprise a non-reactive $C_1$-$C_{20}$ alkyl acrylate monomer. Preferably, the (e) non-reactive $C_1$-$C_{20}$ alkyl acrylate monomer is selected from the group consisting of stearyl acrylate, butyl acrylate, octyl acrylate, decyl acrylate, and lauryl (meth)acrylate.

Preferably, the polymer comprising: (a) a N-vinyl amide monomer, (b) a vinyl acetate monomer, (c) a reactive monomer comprising an acetoacetate moiety, and (e) an additional hydrophobic monomer moiety is selected from the group consisting of vinyl caprolactam/vinyl acetate/acetoacetoxyethyl methacrylate/stearyl acrylate, and vinyl caprolactam/vinyl acetate/allyl acetoacetoacetate/stearyl acrylate.

Polymers in accordance with the present invention may be non-ionic, anionic, or cationic. Furthermore, polymers or compositions containing the polymers may be in powder, solid, liquid, or solution form. Compositions comprising the polymer may be curable via ultra violet (UV) radiation, thermal, electron beam, or gamma irradiation. The polymers may be utilized in the formulation of aqueous, UV curable coatings, or in 100% solid, UV curable coatings. Compositions comprising the polymer may be thermally and/or cationically curable or thermally and/or anionically curable. The polymers or compositions containing the polymers may be thermoplastic polymers that can be produced in either liquid or powder form.

Preferably, the polymer has a solids content of about 15-50% and a viscosity of about 200-15,000 cps. The composition may also be in the form of an aqueous dispersion. The coating composition has a polymer solids content of about 15-50% and a viscosity of about 200-3,000 cps.

The toner receptive coatings may be in the form of a liquid, solid, or wax. Preferably, the toner receptive coatings are in the form of a liquid In another aspect, the invention provides a toner substrate coated with a coating composition containing a polymer comprising: (a) a N-vinyl amide monomer, (b) a vinyl acetate monomer, and (c) a reactive monomer comprising an acetoacetate moiety.

In another aspect, the invention provides a flexible food package substrate coated with a coating composition containing a polymer comprising: (a) a N-vinyl amide monomer, (b) a vinyl acetate monomer, (c) a reactive monomer comprising an acetoacetate moiety, and (e) an additional hydrophobic monomer moiety.

The present invention further provides toner substrates coated with the coating compositions.

Polymeric binders, also referred to as emulsions, latexes, adhesives, glues, dispersions, or resins, are versatile systems in the construction and design of polymers. Examples of suitable binder classes include styrene butadiene rubber (SBR) latex, styrene acrylate, polyvinyl alcohol and copolymers, polyvinyl acetate copolymers, vinyl acetate copolymers, carboxylated SBR latex, polyolefins and copolymer of polyolefins (i.e.; poly(ethylene-co-acrylic acid) and poly (ethylene-co-vinyl acetate)), styrene acrylate copolymers, styrene/butadiene/acrylonitrile, styrene/butadiene/acrylate/acrylonitrile, polyalkylene imines, polyvinyl pyrrolidone and copolymers, polyurethanes, polyamines, polyamides, cationic polyurethanes, polyethylene oxide, poly(2-ethyl-2-oxazoline), polyester resins, gelatins, casein, alginate, cellulose derivatives, hydroxyethyl cellulose, ethyl cellulose, hydroxypropyl cellulose, ethoxylated, oxidized and enzyme converted starches, cationic starches, guar, cationic guar, water soluble gums, acrylic vinyl polymers, soy protein polymers as well as mixtures of water soluble and water-insoluble resins, latexes may be used. Latex binders are most commonly emulsions (polymer particles suspended in a liquid medium).

Preferably, a binder is present in the coating compositions of the invention. A preferred binder is a vinyl acetate-ethylene copolymer, such as Vinnapas® 465 Emulsion, available from Wacker Chemie, AG. Vinnapas® 465 Emulsion is a rapid-setting vinyl acetate-ethylene copolymer, which is a high-solids emulsion. This polymer adheres well to various substrates such as polyester, poly(ethylene terephthalate), tempered aluminum foil and polystyrene. This emulsion combines a high-solids content with a low viscosity, which is a combination that permits the addition of high-filler loadings, resulting in adhesive formulations with solid contents of 80%, or more. Furthermore, this emulsion does not thicken excessively on the addition of plasticizers, which allows for the formulation of very high-solids adhesives. Vinnapas® 465 Emulsion also is shear stable, and can be applied on high-speed packaging machines using roll, extrusion, or spray equipment. The emulsion dries to a slightly tacky, clear, water-resistant film. Another preferred binder is Witcobond W-213 polyurethane dispersion, available from Uniroyal Chemical. Witcobond W-213 polyurethane dispersion is a waterborne, cationic dispersion from aliphatic urethanes. Strong, cohesive films can be produced simply by the evaporation of its water content. Witcobond W-213 polyurethane dispersion is used with cationic additives as a protective coating or surface treatment, where the properties of a light stable, waterborne urethane are suitable, primarily for textiles, nonwovens, fiberglass, paper, wood, urethane foam, or other porous substrates.

Preferably a pigment or pigments (colorant or colorants) are used in the coating compositions of the invention. Suitable pigment materials are described in Hunger's "Industrial Organic Pigments," Itoh's "Dictionary of Pigments," and Leach and Pierce's "Printing Ink Manual." Pigment can be added by mixing components. Pigment or pigments may be added with a plasticizer and/or a filler. The exact choice and amount of pigment will depend upon the final desired coating composition and such information is well known in the art.

The electrophotographic process is disclosed in "Effect of Toner Fixing Temperature on Print Properties in the Electrophotographic Process" by T. Hartus (*TAGA Journal*, 4, 2008, 165-177). The adhesion science of toner is disclosed in "Adhesion of Electrophotographic Toner on Paper" by T. Hartus (*Graphic Arts in Finland* 30, 2001, 3). Information related to the electrophotographic process as well as liquid and dry toner materials can be found in "Handbook of Imaging Materials" by A. S. Diamond and D. S. Weiss (ed.) (Marcel Dekker, 2002). Preferably, the toner receptive coating is suitable for fusing to toner at temperatures between 50° C. and 175° C.

Preferably a surfactant is used in the coating compositions of the invention. Surfactants (wetting agents, are compounds that lower the surface tension of a liquid, the interfacial tension between two liquids, or that between a liquid and a solid. Surfactants may act as detergents, emulsifiers, foaming agents, and dispersants. Surfactants are usually organic compounds that are amphiphilic, meaning they contain both hydrophobic groups and hydrophilic groups. Therefore, a surfactant contains both a water-insoluble (or oil-soluble) component and a water-soluble component. Surfactants will diffuse in water and adsorb at interfaces between air and water or at the interface between oil and water, in the case where water is mixed with oil. The insoluble hydrophobic group may extend out of the bulk water phase, into the air or into the oil phase, while the water-soluble head group remains in the water phase. This alignment of surfactants at the surface modifies the surface properties of water at the water/air or water/oil interface. The exact choice and amount of surfactant will depend upon the final desired coating composition and such information is well known in the art.

Other suitable components for aqueous based coatings of this invention include silicates and silica gels, free radical initiators, aluminates and aluminas, N-vinyl-2-pyrrolidone, N-vinyl-caprolactam, other N-vinyl amides, 1-vinyl imidazole, 4-acryloyl morpholine, polyvinyl pyrrolidone, polyvinyl alcohol, acetoacetylated polyvinyl alcohol, oxygen scavengers, styrene/acrylate latexes, acrylic latexes, polyalkylene glycols, maleic anhydride-co-methyl vinyl ether polymers, polyalkylene imines, oxetanes, oxazolines, benzoxazines, polydi allyldialkylammonium chloride materials, starch, acrylated epoxides, glycidyl acrylate monomers, polyurethanes, acrylated oligomers of polyurethanes, acrylated glycidyl oligomers, polyfunctional acrylates, polyfunctional aziridines, clays, calcium carbonates, talcs, cellulosics, cycloaliphatic epoxides, vinyl ethers, epoxy based dispersions, anionic surfactants (i.e., sodium lauryl sulfate), non-ionic surfactants, cationic surfactants, silanes or silicone based polymers, and anionic polyacrylates, such as polyacrylic acid. Optional components in the composition for optimization of the coating composition when coated on different substrates include pigments, clays, e.g. organoclays and water-swellable clays, acrylic polymers, acrylic copolymers, alginates, carrageenan, microcrystalline cellulose, gelatin, carboxymethylcellulose sodium, hydroxyethylcellulose, hydroxypropylcellulose, hydroxypropylmethylcellulose, methylcellulose, guar and guar derivatives, locust bean gum, polyethylene oxide, polyvinylpyrrolidones, copolymers of polyvinylpyrrolidones, polyvinylalcohols, charge control agents, optical brighteners, other water soluble polymers, silicas, aluminates, zirconates, calcium carbonates, xanthan gums, polymers or copolymers of water soluble vinyl lactams optionally having in situ-formed particles of crosslinked vinyl lactam polymers or copolymers, crosslinked polyvinyl pyrrolidone, and crosslinkers to achieve advantageous printable surface coatings having light stability (see U.S. Pat. No. 6,872,787 B2). Preferred components and optimal amounts of these components will depend upon the specific support coating and application and can be readily determined by one of ordinary skill in the art.

The present invention relates to curing or cross-linking or polymerizing a polymerizable material carried out by any appropriate method known in the arts. Insight into curing and cross-linking technology is disclosed in "Thermosetting Polymers," J. P. Pascault et. al. (Marcel Dekker, New York, 2002), which disclosure is incorporated by reference herein. The polymerization of reactive solution comprising polymerizable polymer may be carried out by employing any of the methods disclosed in "Principles of Polymerization 4$^{th}$ edition," by George Odian (J. Wiley and Sons, Hoboken, N.J., 2004), which disclosure is incorporated by reference herein. The preferable techniques or methods employed by the present invention to polymerize the polymers would include UV-radiation, UV-LED, laser beam, electron beam, gamma irradiation, free-radical, cationic, anionic, thermal, exposure to e-beam and/or by employing a high-energy source in presence of suitable photo initiator for the initiation of polymerization. Suitable sources of radiation include, but are not limited to, mercury, xenon, halogen, carbon arc lamps, sunlight, and radioactive sources.

In order to induce polymerization via irradiation, photoinitiators are often incorporated to initiate the polymerization reaction system. Preferable photoinitiators are selected from the following non-limiting group or class of compounds such as 2-hydroxy-2-methyl-1-phenylpropane-1-one, 1-hydroxycyclohexyl phenyl ketone, and 2-methyl-1-[4-(methylthio)phenyl]-2-morphorinopropane-1-one;
benzoins e.g. benzyl dimethyl ketal; benzophenones such as benzophenone, 4-phenylbenzophenone, and hydroxybenzophenone; thioxanthones such as isopropylthioxanthone and 2,4-diethylthioxanthone; acylphosphine oxides; and other special initiators such as methyl phenyl glyoxylate; bis[4-(di(4-(2-hydroxyethyl)phenyl)sulfonio)phenyl sulfide], a mixture of bis [4-diphenylsulfonio]phenyl)sulfide bis (hexafluoroantimonate and diphenyl-4-thiophenoxyphenyl-sulfonium hexafluoroantimonate, bis[4-(di(4-(2-hydroxyethyl)phenyl)sulfonio)phenyl sulfide], 5-2,4-cyclopentadiene-1-yl-[1,2,3,4,5,6-.eta.)-(1-methylethyl-) benzene]-iron (1+)-hexafluorophosphate(1−)), 4-(2-hydroxytetradecanyloxy)diphenyliodonium hexafluoroantimonate, (4-hydroxynaphtyl)dimethylsulfonium hexafluoroantimonate), photo latent bases such as photo latent diazabicyclo nonene, triphenylsulfonium hexafluorophosphate, triphenylsulfonium hexafluoroantimonate, 4-methoxyphenyldiphenylsulfonium hexafluoroantimonate, 4-methoxyphenyliodonium hexafluoroantimonate, bis(4-tert-butylphenyl)iodonium tetrafluoroborate, (bis(4-tert-butylphenyl)iodonium hexafluorophosphate), (bis(4-tert-phenyl)iodonium hexafluoroantimonate), (bis [4-(diphenylsulfonio)phenyl]sulfide bis(hexafluorophosphate)), aryldiazonium salts, diaryliodonium salts, triaylsulfonium salts, triarylselenonium salts, dialkylphenacylsulfonium salts, triarylsulfoxonium salts, triethanol amine, aryloxydiarylsulfonium salts, and the like for example, triphenylsulfonium hexaflurophosphate, methyidiphenylsulfonium hexafluorophosphate, dimethylphenylsulfonium hexaflurophosphate, diphenyinapththyl-sulfonium hexaflurophosphate, di(methoxynapththyl)methylsulfonium hexaflurophosphate, (4-octyloxyphenyl)phenyl iodonium hexafluoro antimonate, (4-octyloxyphenyl)diphenyl sulfonium hexafluoro antimonate, (4-decyloxyphenyl) phenyl iodonium hexafluoro antimonite, (4-dodecyloxyphenyl)diphenyl sulfonium hexafluoroantimonate. Preferably, the photoinitiator includes 10-biphenyl-4-yl-2-isopropyl-9H-thixanthen-10-ium hexafurophosphate, 4,4'-dimethyl iodonium hexaflurophosphate, mixed triarylsulfonium hexaflurophosphate salts and reaction products of polyol and 10-(2-carboxymethoxy)-biphenyl-4yl-2-isopropyl-9-oxo-9H-thioxanthen-10-ium hexafluorophosphate. The photoinitiators may be used alone or in combinations thereof. Alternatively, the photoinitiator may be used by mixing it with one or more photopolymerization accelerator, such as a benzoic acid (e.g., 4-dimethylaminobenzoic acid) or a tertiary amine (e.g., diazabicyclo nonene (DBN)), in any appropriate ratio. The photoinitiator is preferably added to the photopolymerizable composition in the range of about 0.1% to about 20% by weight.

The coating compositions of the invention can provide a glossy, transparent to matte, opaque finish coating on synthetic films such as polyester, vinyl, polyolefins, and the like, as well as paper and canvas.

Generally, the coating composition has a solids content of about a solids content of about 15-50% and a viscosity of about 200-3000 cps.

The polymer in the coating composition suitably has a K-Value of about 5 to about 100, preferably about 10 to about 70.

Colloidal silica, amorphous colloidal silica particles may be included, e.g. 20-150 n. Preferred colloidal silicas are Silcron IJ-25 and IJ-50. Silica gels, amorphous colloidal silica particles, may also be included, e.g., 4-7 microns. A preferred silica gel is Silcron G 100.

The polymers of the present invention are suitable for use in industrial, personal care, household, and pharmaceutical applications. Industrial uses include, but are not limited to, formulating inks, flocculation agents, hydrogels, surface modification agents, coatings, microporous print media, paper sizing additives, shale swell inhibitors, metal coatings, metal working fluids, rheology modifiers, reactive biocides, decorated titanium, interlaminate adhesives, agricultural compositions, dispersants, batteries, products comprised of iodine, products comprised of silver, products comprised of carbon, products comprised of nano carbons, comb/branch polymer adducts, biocidal films, tackifiers, latex weather resistant modifiers, decorated pigments for inks and pastes, decorated cenospheres, decorated barium sulfate, cross-linkers, automotive products and protective films, super-absorbers (i.e., diapers) (see U.S. Pat. App. 2009/0043005A1, the contents of which are hereby incorporated by reference), printing plates, macro-initiating materials, products comprised of graphene, hydrophilic enhancement agents for membranes (see U.S. Pat. App. Ser. No. 61/242,900 and PCT/US/2010/028852, the contents of which are hereby incorporated by reference), anti-fog coatings, polymer blocks, additives to extrudable compounds and films, protective colloidal agents, multi dimensional printing materials including pigments, polymers and inks (for example see WO/2008/077850A2, the contents of which are hereby incorporated by reference), refractive index modifiers, cross-linking agents, microencapsulation particles and additives (see U.S. Pat. No. 5,811,121 and WO 2007/146722 A1), rheology control agents, grease resistant paper and films, fiber sizing agents, products comprised of alumina, conductive films, cementitious compositions, bioadhesives, tablet coatings, battery binders, resinous UV absorbers (U.S. patent application Ser. No. 12/698,583, the contents of which are hereby incorporated by reference), iodine stabilizers, conductive coatings and gels, reactive rheology modifying agents, macro-initiators, coating flex agents, and non-migratory anti-static agents. Personal care and household applications include, but are not limited to, formulating cosmetics, hair care products, toiletries, hydrogels, laundry products and household cleaning products, and dye absorbent non-woven swatches. Pharmaceutical applications include, but are not limited to, processing aids, medical stents, lubricity modification agents, catheters and other medical device coatings, active ingredient solubilizers, optical lenses, formulating drug delivery systems, and preparing tablet coatings.

The coating compositions can be prepared according to the examples set out below. The examples are presented for purposes of demonstrating, but not limiting, the preparation of the coating compositions of this invention.

EXAMPLES

The following non-limiting examples are provided to illustrate a few of the methods for preparing novel coating compositions for forming toner receptive coatings. The examples are presented for purposes of demonstrating, but not limiting, the preparation of the compounds and compositions of this invention.

Example 1

Synthesis of Vp/VA/AcAc (58.5/40/1.5)

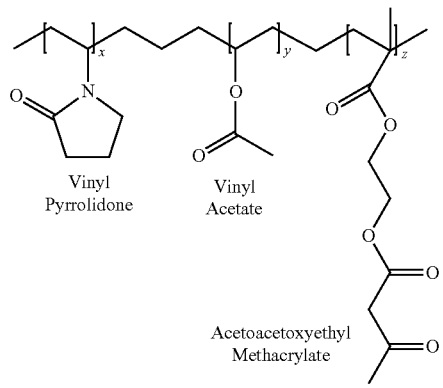

Feed one is prepared with 58.37 g vinyl pyrrolidone (Vp), 2.88 g Acetoacetoxyethyl methacrylate (AcAc) and 46.04 g Isopropanol. Put 172.65 g Isopropanol and 30.92 g Vinyl Acetate (VA) into the reactor and commence purging of the reaction vessel with nitrogen. Heat the reaction flask containing Isopropanol to reflux ~78° C. In a separate vessel prepare a mixture of Triganox 25C 75 (0.5 g) and Isopropanol (23 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional Isopropanol was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture.

Example 2

Synthesis of Vp/VA/AcAc (55/40/5)

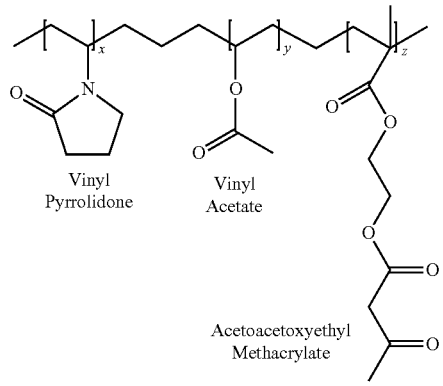

Feed one is prepared with 54.38 g vinyl pyrrolidone (Vp), 9.53 g Acetoacetoxyethyl Methacrylate (AcAc) and 45.62 g Acetone. Put 171.07 g Acetone and 30.63 g and Vinyl Acetate (VA) into the reactor and commence purging of the reaction vessel with nitrogen. Heat the reaction flask containing Acetone to reflux ~58° C. In a separate vessel prepare a mixture of Triganox 25C 75 (0.5 g) and Acetone (23 g). Label this vessel "Triganox Solution". When the reaction flask has reached reflux temperature, begin adding Feed 1, drop-wise, in to the reaction vessel over a period of 180 minutes. After 15 minutes of monomer feed, add 2.25 g of the Triganox Solution into the reactor. Continue the drop-wise addition of Feed 1 over a period of approximately 165 minutes. While the monomers are feeding into the reactor, after 30 minutes charge 2.25 of the Triganox solution. After 45, 60, 75, 90, 105 and 120 minutes, charge 2.25 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional Acetone was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture.

Example 3

Synthesis of VCap/VA/AcAc (58.5/40/1.5)

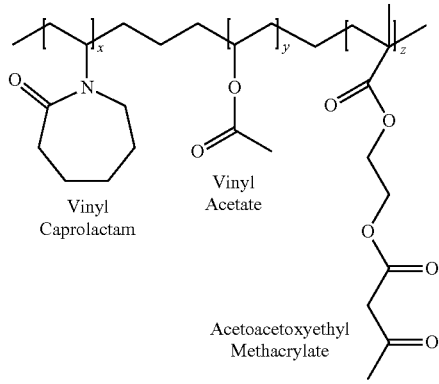

Feed one is prepared with 70.07 g vinyl caprolactam (VCap), 2.77 g Acetoactoxyethyl Methacrylate (AcAc) and 44.19 g Isopropanol. Put 165.72 g Isopropanol and 29.68 g Vinyl Acetate (VA) into the reactor and commence purging of the reaction vessel with nitrogen. Heat the reaction flask containing Isopropanol to reflux ~78° C. In a separate vessel prepare a mixture of Triganox 25C 75 (0.5 g) and Isopropanol (22 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 2.25 of the Triganox solution. After 45, 60, 75, 90, 105 and 120 minutes, charge 2.25 g Triganox solution into the reactor. After 150 minutes, charge 2.25 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional Isopropanol was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture.

Example 4

Synthesis of VCap/VA/AcAc (55/40/5)

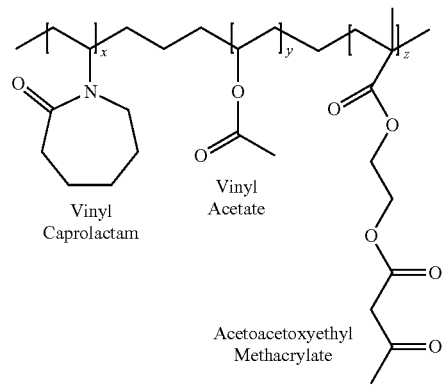

Feed one is prepared with 65.46 g vinyl caprolactam (VCap), 9.17 g Acetoacetoxyethyl Methacrylate (AcAc) and 44.00 g Acetone. Put 164.66 g Acetone and 29.48 g Vinyl Acetate (VA) and into the reactor and commence purging of the reaction vessel with nitrogen. Heat the reaction flask containing Acetone to reflux ~78° C. In a separate vessel prepare a mixture of Triganox 25C 75 (0.5 g) and Acetone (22 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 2.25 of the Triganox solution. After 45, 60, 75, 90, 105 and 120 minutes, charge 2.25 g Triganox solution into the reactor. After 150 minutes, charge 2.25 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional Acetone was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture.

Example 5

Synthesis of VCap/VA/AcAc/Stearyl Acrylate (45/40/5/10)

Feed one is prepared with 51.23 g vinyl caprolactam (VCap); 26.59 g Stearyl Acrylate, 8.77 g Acetoacetoxyethyl methacrylate (AcAc) and 42.45 g MEK. Put 157.51 MEK, and 28.20 g Vinyl Acetate (VA) into the reactor and commence purging of the reaction vessel with nitrogen. Heat the reaction flask containing Acetone to reflux—approximately ~58C. In a separate vessel prepare a mixture of Triganox 25C 75 (0.5 g) and MEK (21 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 2.3of the Triganox solution. After 45, 60, 75, 90, 105 and 120 minutes, charge 2.3 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture.

Example 6

Ink Adhesion on Primer-Coated Clear Polyester

Testing Procedure

Method 1

Preparation of Ink Film and Ink Strips

HP Electroink Black was transferred entirely to a plastic container. This ink was folded repeatedly with a spatula by mixing the suspended ink particulates to a homogeneous ink paste.

The ink paste mentioned (20.0 g) and HP Imaging oil (10.0 g) were added to a 60 ml screw-capped glass vial and mixed well by vigorous shaking to obtain a sample of diluted ink suspension.

Non-Corona treated surface of Clear Polyester film (5 mil, 8.5 inch×11 inch) was coated with the sample of diluted ink suspension obtained in the previous step by drawing down a thin ink film on the Clear polyester surface using Meyer Coating Rod #26. The wet ink film obtained was allowed to sit on a flat surface for 10 min at room temperature.

The ink film on Clear polyester thus obtained in the previous step was further dried under vacuum at 100° C. for 20 min in a vacuum oven and then cooled to room temperature to obtain Ink-coated Clear Polyester film.

Square sections (1 inch×1 inch) of the Ink-coated Clear polyester film thus obtained in the previous step and referred to as Ink Strips were cut out and used to perform ink adhesion tests on primed substrates.

Example 7

Method 2

Preparation of Primed Clear Polyester Substrate Films

Primer coating formulations containing single polymer or combination of polymers used as primers were prepared either as clear solutions (30% Solids, in Acetone, MEK, Ethanol, Reagent Alcohol, IPA or water) or as dispersions (30% Solids, in water).

Primer coating formulations thus obtained in the previous step were applied on non-Corona treated surface of Clear Polyester films (5 mil, 8.5 inch×flinch) and a thin uniform film of Primer coating formulation was drawn on the Clear Polyester using Meyer Coating Rods #6, #3 or #0 to adjust for required dry coat weight (1-2 $g/m^2$).

The primer coated Clear Polyester films thus obtained in the previous step were either allowed to air-dry for 1 hour at room temperature (for volatile solvents like Acetone, MEK, Ethanol, Reagent Alcohol or IPA) or dried under vacuum at 130° C. for 15 min in a vacuum oven (for water solutions or dispersions) to obtain dry primed substrate films.

Rectangular sections (2 inch×6 inch) of dry primed substrate films thus obtained in the previous step and are referred to as Substrate Strips were cut out and used to perform ink adhesion tests.

Example 8

Method 3

Ink Adhesion Test on Substrate Strips and Adhesion Performance Grading

The top face of a hot plate (10.5 inch×10.5 inch) was covered with a Teflon sheet (8 inch×8 inch) and the hot plate surface was maintained at a temperature of 120° C. (±4° C.). Sufficient time was allowed for the Teflon sheet to equilibrate with the hot plate surface temperature and temperature on exposed surface of Teflon sheet was measured using an Infrared thermometer.

The Ink Strip was placed on the heated Teflon sheet with the ink-coated side facing up. Ink coating on the Ink Strip was allowed to equilibrate to the temperature of the hot plate (120° C.±4° C.) for 2 minutes and temperature of top ink layer measured using an Infrared thermometer.

The Substrate Strip was placed on the heated Ink Strip with the primed side facing down and in contact with the heated ink coating on the Ink Strip.

The Substrate Strip was pressed against the Ink Strip on the hot plate using a Teflon coated rolling pin while applying maximum possible manual pressure (32 rolls, 1 roll=1 forward roll+1 backward roll) to obtain a Substrate Strip-Ink Strip assembly.

The Substrate Strip-Ink Strip assembly thus obtained in the previous step was lifted from the Teflon sheet on the hot plate and placed on a cold flat surface with the primed surface of the Substrate Strip facing up and allowed to equilibrate room temperature for 2 min.

After 2 min, the clear polyester backing of the ink strip was manually separated from the Substrate Strip-Ink Strip assembly to leave a thin (~0.2 mil) layer of ink on the primed surface of Substrate Strip, henceforth referred to as Ink Patch.

A hatch-pattern consisting of 40 small rectangles was scored on ink patch thus obtained in the previous step using a razor blade.

Office tape (Scotch® Transparent Tape) was applied on the hatch-pattern on the ink patch on the primed substrate and firm pressure was applied on the tape to ensure maximum adhesion of office tape with ink surface. The office tape was allowed to stay on the ink patch for 10 min and then sharply lifted off to check ink removal from the ink patch.

The results from Test Method 1 in this Ink Adhesion Performance Grading experiment are as follows:
ink removal=0%, Grade=10;
ink removal=100%, Grade=0.

Example 9

Using Test Method 3

| INGREDIENT | INGREDIENT TYPE | PHYSICAL STATE | % of Ingredient in Coating | Grade with Office Tape |
|---|---|---|---|---|
| Vp/VA/AcAc (58.5/40/1.5) Ex. 1 | Inventive Adhesive | Film | 100 | 7-8 |
| Vp/VA/AcAc (55/40/5) Ex. 2 | Inventive Adhesive | Film | 100 | 8-9 |
| VCap/VA/AcAc (58.5/40/1.5) Ex. 3 | Inventive Adhesive | Film | 100 | 8-9 |
| VCap/VA/AcAc (55/40/5) Ex. 4 | Inventive Adhesive | Film | 100 | 8-9 |

While a number of embodiments of this invention have been represented, it was apparent that the basic construction can be altered to provide other embodiments that utilize the invention without departing from the spirit and scope of the invention. All such modifications and variations are intended to be included within the scope of the invention as defined in the appended claims rather than the specific embodiments that have been presented by way of example.

We claim:

1. A toner receptive coating composition on a substrate containing a polymer comprising: (a) a N-vinyl amide monomer, (b) a vinyl acetate monomer, (c) a reactive monomer comprising an acetoacetate moiety, and (d) a solvent.

2. The coating composition according to claim 1, wherein (a) the N-vinyl amide monomer is selected from the group consisting of N-vinyl pyrrolidone, N-vinyl valerolactam, N-vinyl caprolactam, hydroxyethylpyrrolidone methacrylate, and N-vinyl formamide.

3. The coating composition according to claim 1, wherein (a) and (b) are N-vinyl pyrrolidone-co-vinyl acetate or n-vinyl caprolactam-co-vinyl acetate.

4. The coating composition according to claim 3, wherein (a) and (b) are N-vinyl pyrrolidone-co-vinyl acetate.

5. The coating composition according to claim 1, wherein the monomer in (c) the reactive monomer comprising an acetoacetate moiety is selected from the group consisting of amide, alkyl, carboxyl, carbonyl, and ether groups.

6. The coating composition according to claim 5, wherein (c) the reactive monomer comprising an acetoacetate moiety is selected from the group consisting of acetoacetoxyethyl methacrylate, acetoacetoxyethyl acrylate, and allyl acetoacetate.

7. The coating composition according to claim 1, wherein (a) is 0.1-80%, (b) is 1-80%, (c) is 1-80%, and (d) is to 100%, by weight.

8. A toner receptive coating composition on a substrate containing a polymer comprising: (a) a N-vinyl amide monomer, (b) a vinyl acetate monomer, (c) a reactive monomer comprising an acetoacetate moiety, and (d) a solvent; wherein the composition has a solids content of about 15-50% and a viscosity of about 200-3000 cps.

9. The coating composition according to claim 1, wherein the polymer comprising: (a) a N-vinyl amide monomer, (b) a vinyl acetate monomer, (c) a reactive monomer comprising an acetoacetate moiety, and (d) a solvent is selected from the group consisting of vinyl pyrrolidone/vinyl acetate/acetoacetoxyethyl methacrylate, vinyl caprolactam/vinyl acetate/acetoacetoxyethyl methacrylate, vinyl pyrrolidone/vinyl acetate/allyl acetoacetate, and vinyl caprolactam/vinyl acetate/allyl acetoacetate.

10. The coating composition according to claim 1, further comprising (e) a non-reactive hydrophobic monomer.

11. The coating composition according to claim 10, wherein (e) the non-reactive hydrophobic monomer comprises a non-reactive $C_1$-$C_{20}$ alkyl acrylate monomer.

12. The coating composition according to claim 11, wherein (e) the non-reactive $C_1$-$C_{20}$ alkyl acrylate monomer is selected from the group consisting of stearyl acrylate, butyl acrylate, octyl acrylate, decyl acrylate, and lauryl (meth)acrylate.

13. A toner receptive coating composition on a substrate containing a polymer comprising: (a) a N-vinyl amide monomer, (b) a vinyl acetate monomer, (c) a reactive monomer comprising an acetoacetate moiety, and (d) a solvent; further comprising (f) a binder, (g) a pigment, and (h) a surfactant.

14. The coating composition according to claim 10, wherein the polymer is selected from the group consisting of vinyl caprolactam/vinyl acetate/acetoacetoxyethyl methacrylate/stearyl acrylate and vinyl caprolactam/vinyl acetate/allyl acetoacetoacetate/stearyl acrylate.

15. The coating composition according to claim 1, wherein the composition is in the form of an aqueous dispersion.

16. The coating composition according to claim 1, wherein the polymer further comprises an additive selected from the group consisting of adhesives, aerosols, agricultural agents, anti-soil redeposition agents, batteries agents, beverages, biocides, block copolymers, branch/comb copolymers, cementing agents, cleaning agents, coating agents, conductive materials, cosmetic agents, cross-linkers, dental agents, decorated pigments, detergents, dispersants, drugs, electronics, encapsulations, foods, hair sprays, household-industrial-institutional, inks and coatings, interlaminate adhesives, lithographic solutions, membrane additive agents, metal working fluids, oilfield agents, paints, paper, paper sizing agents, personal care agents, pharmaceuticals, pigment additives, plasters, plastics, printing, reactive biocides, reactive rheology modifiers, refractive index modifiers, sequestrants, soil release agents, static control agents, and wood-care agents.

17. The coating composition according to claim 10, wherein the polymer further comprises an additive selected from the group consisting of adhesives, aerosols, agricultural agents, anti-soil redeposition agents, batteries agents, beverages, biocides, block copolymers, branch/comb copolymers, cementing agents, cleaning agents, coating agents, conductive materials, cosmetic agents, cross-linkers, dental agents, decorated pigments, detergents, dispersants, drugs, electronics, encapsulations, foods, hair sprays, household-industrial-institutional, inks and coatings, interlaminate adhesives, lithographic solutions, membrane additive agents, metal working fluids, oilfield agents, paints, paper, paper sizing agents, personal care agents, pharmaceuticals, pigment additives, plasters, plastics, printing, reactive biocides, reactive rheology modifiers, refractive index modifiers, sequestrants, soil release agents, static control agents, and wood-care agents.

18. A toner substrate coated with a coating composition containing a polymer comprising: a polymer comprising: (a) a N-vinyl amide monomer, (b) a vinyl acetate monomer, (c) a reactive monomer comprising an acetoacetate moiety, and (d) a solvent.

19. The toner substrate coated with a coating composition according to claim 18, further comprising (e) a non-reactive hydrophobic monomer.

20. A flexible food package substrate coated with a coating composition containing a polymer comprising: (a) a N-vinyl amide monomer, (b) a vinyl acetate monomer, (c) a reactive monomer comprising an acetoacetate moiety, and (d) a solvent.

21. A flexible food package substrate coated with a coating composition according to claim 20, further comprising (e) a non-reactive hydrophobic monomer.

22. The coating composition according to claim 1, wherein the polymer has the following structure:

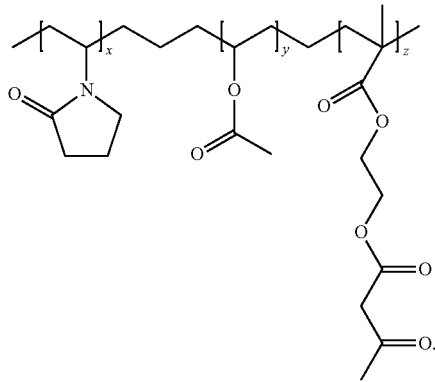

23. The coating composition according to claim 1, wherein the polymer has the following structure:

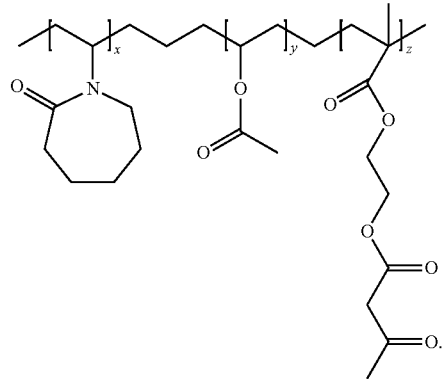

24. A toner receptive coating composition containing a polymer comprising: (a) a N-vinyl amide monomer, (b) a vinyl acetate monomer, (c) a reactive monomer comprising an acetoacetate moiety, and (d) a solvent.

25. The coating composition according to claim 24, wherein (a) the N-vinyl amide monomer is selected from the group consisting of N-vinyl pyrrolidone, N-vinyl valerolactam, N-vinyl caprolactam, hydroxyethylpyrrolidone methacrylate, and N-vinyl formamide.

26. The coating composition according to claim 24, wherein (a) and (b) are N-vinyl pyrrolidone-co-vinyl acetate or n-vinyl caprolactam-co-vinyl acetate.

27. The coating composition according to claim 26, wherein (a) and (b) are N-vinyl pyrrolidone-co-vinyl acetate.

28. The coating composition according to claim 24, wherein the monomer in (c) the reactive monomer comprising an acetoacetate moiety is selected from the group consisting of amide, alkyl, carboxyl, carbonyl, and ether groups.

29. The coating composition according to claim 24, wherein the toner receptive coating composition is on a substrate.

\* \* \* \* \*